US012718435B2

(12) United States Patent
Fantinuoli

(10) Patent No.: US 12,718,435 B2
(45) Date of Patent: Aug. 25, 2026

(54) SYSTEMS AND METHODS FOR REAL TIME SUGGESTION BOT

(71) Applicant: KUDO, INC., New York, NY (US)

(72) Inventor: Claudio Fantinuoli, New York, NY (US)

(73) Assignee: KUDO, INC., New York, NY (US)

( * ) Notice: Subject to any disclaimer, the term of this patent is extended or adjusted under 35 U.S.C. 154(b) by 0 days.

(21) Appl. No.: 18/312,489

(22) Filed: May 4, 2023

(65) Prior Publication Data

US 2023/0274730 A1 Aug. 31, 2023

Related U.S. Application Data

(63) Continuation of application No. 17/337,316, filed on Jun. 2, 2021, now abandoned.

(51) Int. Cl.

| | |
|---|---|
| ***G10L 15/08*** | (2006.01) |
| ***G06F 3/0485*** | (2022.01) |
| ***G06F 16/338*** | (2019.01) |
| ***G06F 16/35*** | (2025.01) |
| ***G06F 16/538*** | (2019.01) |
| ***G06F 16/953*** | (2019.01) |

(Continued)

(52) U.S. Cl.

CPC ............ *G10L 15/08* (2013.01); *G06F 3/0485* (2013.01); *G06F 16/338* (2019.01); *G06F 16/35* (2019.01); *G06F 16/538* (2019.01); *G06F 16/953* (2019.01); *G06N 20/00* (2019.01); *G06T 11/60* (2013.01); *G10L 15/26* (2013.01); *G06T 2200/24* (2013.01)

(58) Field of Classification Search

None

See application file for complete search history.

(56) References Cited

U.S. PATENT DOCUMENTS

| | | | |
|---|---|---|---|
| 6,272,461 | B1 | 8/2001 | Meredith et al. |
| 7,729,916 | B2 | 6/2010 | Coffman et al. |

(Continued)

OTHER PUBLICATIONS

Chien, Jen-Tzung. "Hierarchical theme and topic modeling." IEEE transactions on neural networks and learning systems 27.3 (2015): 565-578. (Year: 2015).*

(Continued)

*Primary Examiner* — Maria S Ayad

(74) *Attorney, Agent, or Firm* — Foley & Lardner LLP

(57) ABSTRACT

Disclosed herein are embodiments of systems and methods for automated real time exploration of topics of interest during an electronic communication session. One or more meeting participants identify a category of interest, and operate an electronic device in the electronic communication session. A processor executes a machine learning model to identify one or more spoken words within a set of spoken words during the electronic communication session as one or more units of interest corresponding to the category of interest. The machine learning model may be trained to determine a context of the set of spoken works and to identify the one or more units of interest based on the context. The processor retrieves content associated with the units of interest from one or more data collections associated with the category of interest. The processor presents the content for display in real time in a graphical user interface.

14 Claims, 4 Drawing Sheets

(51) Int. Cl.
*G06N 20/00* (2019.01)
*G06T 11/60* (2026.01)
*G10L 15/26* (2006.01)

(56) References Cited

U.S. PATENT DOCUMENTS 7,735,101 B2 * 6/2010 Lanza .................. G11B 27/322 725/32
7,865,367 B2 * 1/2011 Carro .................. G06F 16/9558 704/270.1
8,495,496 B2 7/2013 Bastide et al.
8,848,027 B2 * 9/2014 DeLand .................. G10L 21/10 348/14.08
8,990,235 B2 3/2015 King et al.
9,411,830 B2 8/2016 Mei et al.
9,471,203 B1 * 10/2016 O'Dell, III .......... G06F 16/4393
9,483,532 B1 11/2016 Zhang et al.
9,672,827 B1 * 6/2017 Jheeta ................... G06F 16/338
10,147,427 B1 * 12/2018 Johnson ................ G06F 16/686
10,366,168 B2 7/2019 Wu
10,540,971 B2 * 1/2020 Kumar ................ H04L 12/1827
10,585,991 B2 3/2020 Miller et al.
10,757,148 B2 * 8/2020 Nelson ................ H04L 65/4015
10,971,121 B2 * 4/2021 Kakoyiannis ........... G06F 16/61
11,093,110 B1 * 8/2021 Bossio .................... G10L 15/26
11,263,407 B1 * 3/2022 Jawale .................. G06F 40/166
11,593,566 B2 * 2/2023 Jawale ..................... G06N 5/04
11,763,823 B2 * 9/2023 Nareddy ............. G06F 16/3344 704/235
11,960,520 B2 * 4/2024 Anand ................ G06F 18/2133
12,014,737 B2 * 6/2024 Rahmel .................. G06N 20/00
12,424,199 B2 * 9/2025 Swvigaradoss ....... G06F 40/274
2008/0235018 A1 * 9/2008 Eggen ..................... G10L 15/26 704/E15.045
2010/0124892 A1 * 5/2010 Issa ......................... G10L 15/26 455/179.1
2013/0036076 A1 2/2013 Yang et al.
2013/0151531 A1 * 6/2013 Li .......................... G06Q 50/01 707/E17.089
2013/0159236 A1 * 6/2013 Vladislav ................. G06N 5/02 706/46
2014/0229471 A1 8/2014 Galvin et al.
2014/0269678 A1 * 9/2014 McGee ................... G06F 40/58 370/352
2015/0154183 A1 * 6/2015 Kristjansson ............ H04N 7/15 704/E13.001
2015/0350258 A1 12/2015 Griffin et al.
2016/0379106 A1 12/2016 Qi et al.
2017/0213193 A1 7/2017 Kitada et al.
2017/0310716 A1 * 10/2017 Lopez Venegas .......................... G06Q 10/1093
2018/0039634 A1 2/2018 Goldstein et al.
2018/0101824 A1 4/2018 Nelson et al.
2018/0331842 A1 11/2018 Faulkner et al.
2019/0073359 A1 * 3/2019 Lim ........................ G06F 40/58
2019/0132265 A1 * 5/2019 Nowak-Przygodzki ..................... G06Q 10/1093
2019/0303107 A1 10/2019 Kelly
2019/0303407 A1 10/2019 Dessau
2019/0361945 A1 11/2019 Chang et al.
2020/0152183 A1 5/2020 Wang et al.
2020/0279074 A1 * 9/2020 Shires ..................... G10L 21/10
2020/0279567 A1 * 9/2020 Adlersberg ............. G06F 40/35
2020/0293616 A1 * 9/2020 Nelson .................. G06F 40/289
2021/0390144 A1 12/2021 B M S et al.
2022/0164683 A1 * 5/2022 Hao ........................ G06F 16/35
2022/0382445 A1 * 12/2022 Hu ........................ G06F 40/166
2024/0378236 A1 * 11/2024 Kharbanda ....... G06F 16/33295

OTHER PUBLICATIONS

Adji B. Dieng, Francisco J. R. Ruiz, David M. Blei; "The Dynamic Embedded Topic Model"; https://arxiv.org/abs/1907.05545; Oct. 14, 2019; 17 pages.

Final Office Action on U.S. Appl. No. 17/337,316 DTD Feb. 9, 2023.

Jianwen Wang, Xiaohua Hu, Xinhui Tu, Tingting He; "Author-conference topic-connection model for academic network search"; Proceedings of the 21st ACM international conference on Information and knowledge management; https://dl.acm.org/doi/abs/10.1145/2396761.2398597; Oct. 2012; 5 pages.

Jie Tang, Ruoming Jin, Jing Zhang; "A Topic Modeling Approach and its Integration into the Random Walk Framework for Academic Search", 2008 Eighth IEEE International Conference on Data Mining; Dec. 2008; 6 pages.

Jordan Boyd-Graber, David Blei, Xiaojin Zhu; "A Topic Model for Word Sense Disambiguation"; EMNLP-CoNLL, pp. 1024-1033, 2007; 10 pages.

Lin-Chih Chen, "An effective LDA-based time topic model to improve blog search performance", Information Processing & Management; November 2107, 22 pages.

Mark Baillie, Mark Carman. Fabio Crestani; "A multi-collection latent topic model for federated search"; https://link.springer.com/article/10.1007%2Fs10791-010-9147-3; Oct. 7, 2010; 23 pages.

Non-Final Office Action on U.S. Appl. No. 17/337,316 dated Sep. 28, 2022 (29 pages).

Yu Wu, Zhoujun Li, Wei Wu, Ming Zhou; "Response selection with topic clues for retrieval-based chatbots"; Neurocomputing, vol. 316, pp. 251-261; https://arxiv.org/abs/1605.00090; Nov. 17, 2018; 8 pages.

Chien, Jen-Tzung, and Chuang-Hua Chueh. "Topic-based hierarchical segmentation." IEEE Transactions on Audio, Speech, and Language Processing 20.1 (2011): 55-66 (Year: 2011).

* cited by examiner 250
262
258
280
264
268
260
270
254
235

Main Video Display 210

Screen Sharing / Document Display 220

UNIT-INT 290

Lorem ipsum dolor sit amet, consectetur adipiscing elit, sed do eiusmod tempor incididunt Ut labore et dolore magna aliqua. Ut enim ad minim veniam, quis nostrud exercitation ullamco laboris nisi ut aliquip ex ea commodo consequat.

Duis aute irure dolor in reprehenderit in voluptate velit esse cillum dolore eu fugiat nulla pariatur. Excepteur sint occaecat cupidatat non proident, sunt in culpa qui officia deserunt mollit Lorem ipsum dolor sit amet, consectetur adipiscing elit, sed do eiusmod tempor incididunt ut labore et dolore magna aliqua.

Controls 230

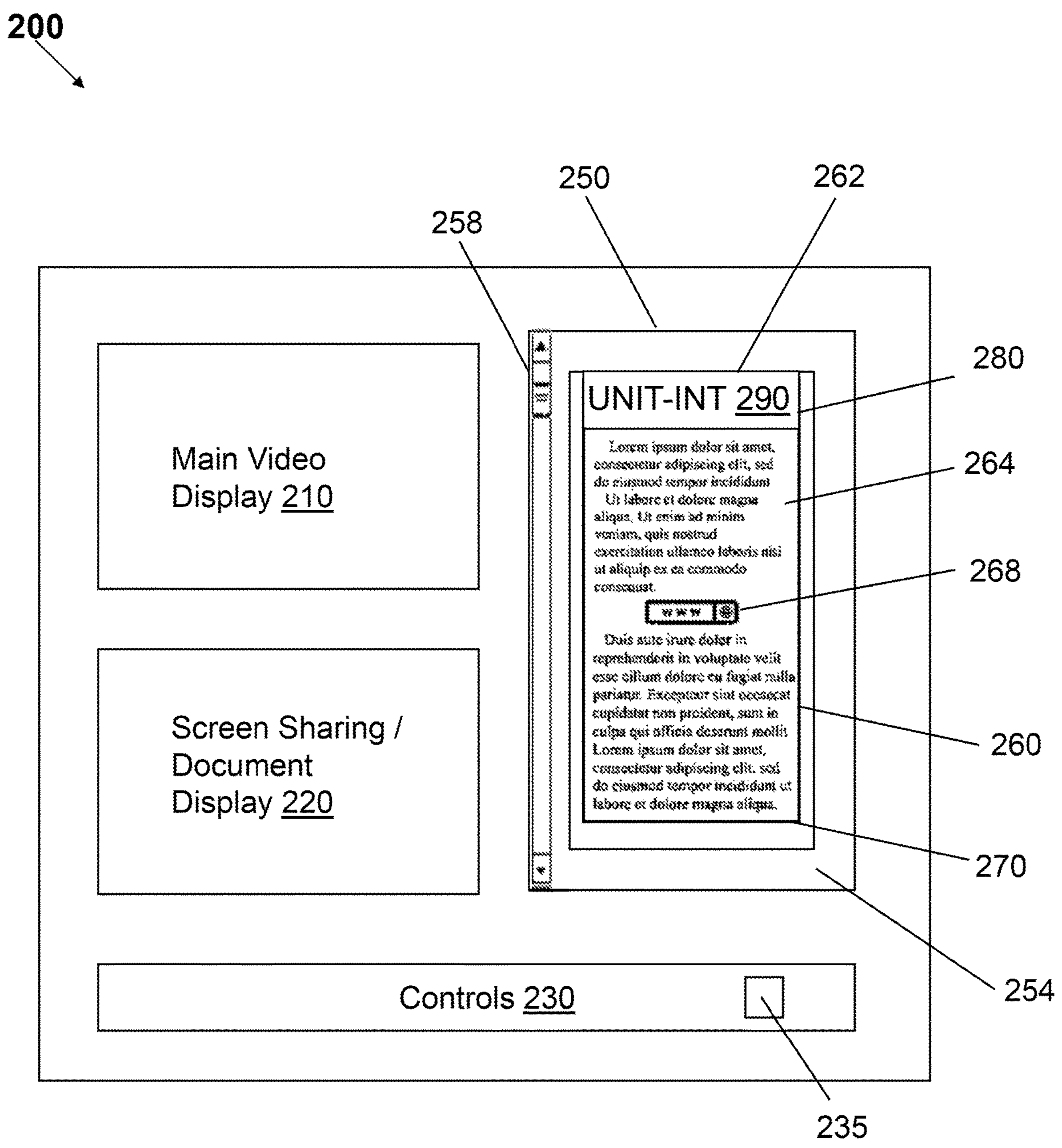

SYSTEMS AND METHODS FOR REAL TIME SUGGESTION BOT

CROSS-REFERENCE TO RELATED APPLICATIONS

This application is a continuation of U.S. patent application Ser. No. 17/337,316, filed Jun. 2, 2021, which is incorporated by reference in its entirety.

TECHNICAL FIELD

This application relates generally to methods and systems for automated suggestions concerning topics of interest during online meetings.

BACKGROUND

In various architectures, service providers, and enterprises may offer online meeting services for their end users. A conferencing architecture can offer an "in-person" meeting experience over a network. Conferencing architectures can also deliver real-time interactions between people using advanced visual, audio, and multimedia technologies. Virtual meetings and conferences have an appeal because they can be held without the associated travel inconveniences and costs. In addition, virtual meetings can provide a sense of community to participants who are dispersed geographically.

There are diverse types of virtual meetings and various tools that support such meetings. Virtual meetings can include oral presentations by speakers, sharing of documents, conversations of participants, and other traditional forms of information sharing. In some scenarios, meeting participants may wish to supplement traditional forms of information sharing during a virtual meeting with additional information concerning meeting subjects or other topics of interest. In conventional practice, meeting participants may supplement information shared during a meeting with additional information obtained after a meeting. However, collecting additional information after a meeting misses the opportunity for real time exploration of topics of interest raised by meeting speakers or participants during virtual meetings.

SUMMARY

For the aforementioned reasons, there is a need for systems and methods that support automated real time exploration of topics of interest raised during virtual meetings. Discussed herein are systems and methods that improve accessibility of suggestions and explanations in real time about content raised by meeting speakers. Discussed herein are systems and methods that provide an interactive and immersive user experience in presenting supplemental information concerning topics of interest raised during virtual meetings.

In one embodiment, a method may include identifying, by a processor, a category of interest to one or more meeting participants operating an electronic device in an electronic communication session. The method may execute, by the processor, a machine learning model to identify one or more spoken words within a set of spoken words during the electronic communication session as one or more units of interest corresponding to the category of interest. The machine learning model may be trained to determine a context of the set of spoken words and to identify the one or more units of interest based on the context of the set of spoken words. The method may further include retrieving content associated with the one or more units of interest from one or more data collections associated with the category of interest. The method may present the content for display in real time during the electronic communication session.

In another embodiment, a system may include an electronic device being operated by one or more meeting participants operating an electronic device in an electronic communication session, a storage medium storing a category of interest to the one or more meeting participants, and a server in communication with the storage medium and connected to the electronic device via one or more networks. The server is configured to execute a machine learning model to identify one or more spoken words within a set of spoken words during the electronic communication session as one or more units of interest corresponding to the category of interest. The machine learning model may be trained to determine a context of the set of spoken words and to identify the one or more units of interest based on the context of the set of spoken words. The system may be further configured to retrieve content associated with the one or more units of interest from one or more data collections associated with the category of interest, and present the content for display in real time during the electronic communication session.

In another embodiment, a system may include a non-transitory storage medium storing a plurality of computer program instructions, and a processor of a first electronic device electrically coupled to the non-transitory storage medium. The processor of the first electronic device is configured to execute the plurality of computer program instructions to identify a category of interest to one or more meeting participants operating a second electronic device in an electronic communication session. The processor of the first electronic device is configured to execute a machine learning model to identify one or more spoken words within a set of spoken words during the electronic communication session as one or more units of interest corresponding to a category of interest. The machine learning model may be trained to determine a context of the set of spoken words and to identify the one or more units of interest based on the context of the set of spoken words. The processor of the first electronic device is further configured to retrieve content associated with the one or more units of interest from one or more data collections associated with the category of interest, and present the content for display by the second electronic device in real time during the electronic communication session.

It is to be understood that both the foregoing general description and the following detailed description are illustrative and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

FIG. 2 shows a representative view of a graphical user interface including a GUI element displaying a document including additional content related to an identified unit of interest, according to an embodiment.

DETAILED DESCRIPTION

Figure 1:
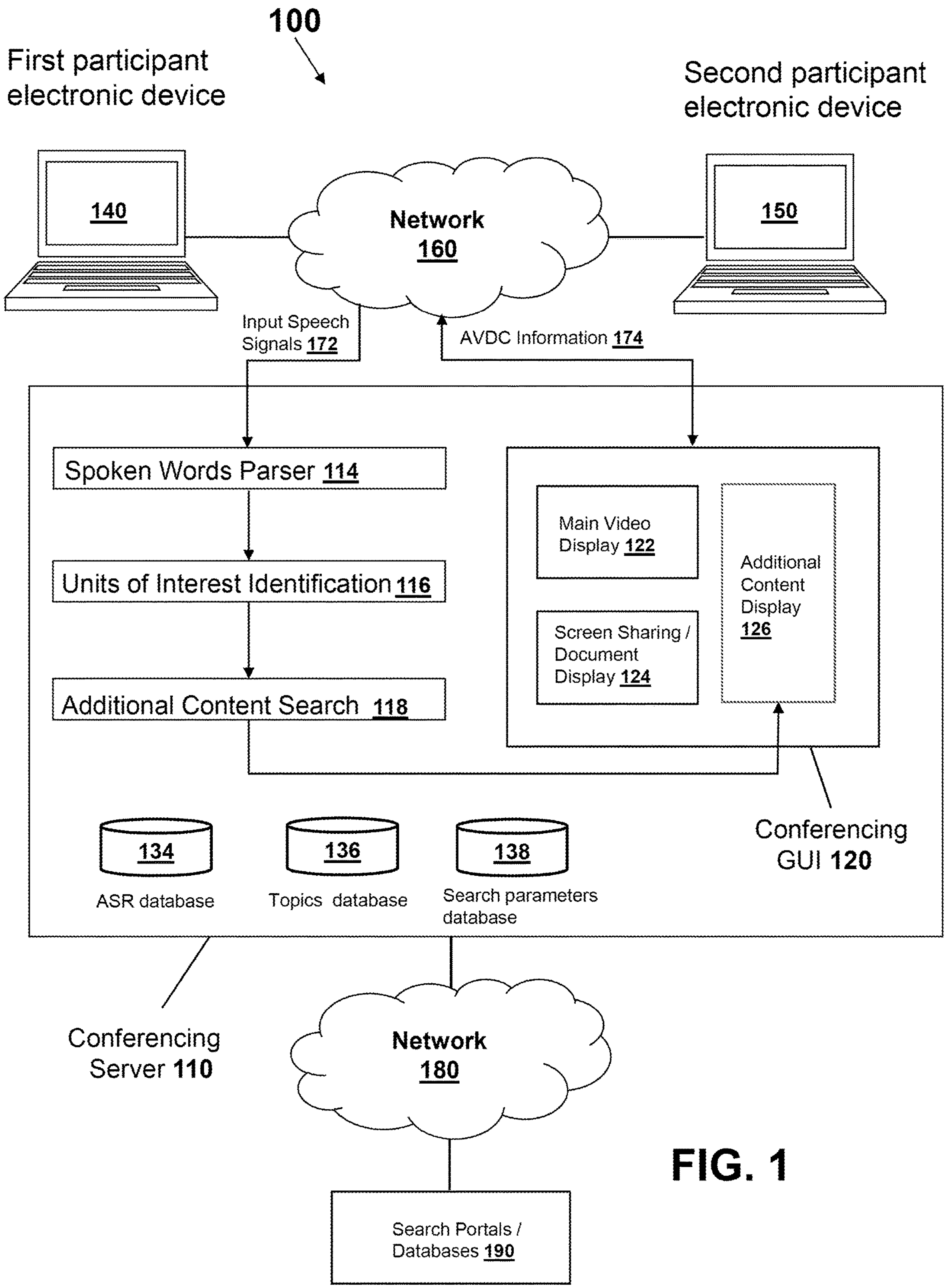
FIG. 1 shows components of an illustrative system for automated generation and display of additional content concerning units of interest during online meetings, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. Other embodiments may be used and/or other changes may be made without departing from the spirit or scope of the present disclosure.

Various embodiments described herein generally relate to methods and systems for automated real time exploration of topics of interest during an online meeting. In some embodiments, one or more meeting participants operating an electronic device in an electronic communication session identify a category of interest. In some embodiments, a processor executes a machine learning model to identify one or more spoken words within a set of spoken words during the electronic communication session as one or more units of interest corresponding to the category of interest. The machine learning model may be trained to determine a context of the set of spoken words and to identify the one or more units of interest based on the context of the set of spoken words. The method may further include retrieving content associated with the one or more identified units of interest from one or more data collections associated with the category of interest. The method may present the content for display in real time during the electronic communication session. In various embodiments, a video conferencing server presents for display in real time a graphical user interface including a screen overlay showing content associated with one or more identified units of interest. Disclosed embodiments provide an interactive and immersive user experience in presenting information concerning topics of interest raised by meeting participants during online meetings.

A virtual meeting is a meeting that occurs online rather than physically with all the participants in the same meeting room. Virtual meetings are also referred to herein as online meetings. There are various types of online meetings and tools that support such meetings. Web presentation, also known as webcasting, includes tools that support presentations during meetings to a dispersed audience. Typical features of a web presentation tool include audio conferencing, screen sharing, whiteboard platform, and chat. Additional features may include file sharing, video sharing, archiving capability, permission level setting by participant (e.g., ability to switch presenters), and interruption tools. Video conferencing allows virtual teams to see each other while meeting from remote locations. Many of the features of video conferencing overlap with web presentation tools such as file sharing, screen sharing, whiteboard platform, and chat. Video conferencing typically includes a presentation mode, which enables a given participant to control a meeting. Audio conferencing allows multiple persons and locations to hold real-time meetings via audio call in which all participants dial into a central system. Commonly employed features include Voice over Internet Protocol (VOIP) support and conference-bridge.

Online meeting tools may support specialized services. Mind Mapping tools allow for visual organization of ideas. Key features include online visualization and support of multiple data types, including images, spreadsheets, and text. Group Authoring tools facilitate writing and editing of documents by multiple people. Key features include version control, real-time collaboration, and support of multiple platforms. Group Modeling tools are similar to group authoring tools in that they allow for multiple people to contribute to the creation of a single document or artifact, typically including graphical representations of ideas and data. Chat tools for work provide instant messaging communications and organization tools for real-time team collaboration.

Various embodiments described herein address the need of meeting participants to supplement conventional forms of information sharing during an online meeting with additional information concerning topics of interest. For example, meeting participants may wish to obtain explanations of technical terminology raised during a meeting, or additional details about meeting subjects such as names, important dates, etc. Presenting additional information concerning topics of interest to meeting participants in real time can enrich meeting discussions and provide other advantages in comparison to obtaining the additional information after a meeting. Disclosed embodiments process a set of spoken words during an online meeting to automatically identify units of interest to meeting participants from the spoken words according to pre-set criteria. In disclosed embodiments, the system and method retrieve additional content related to identified units of interest via real-time crawling of web/document information resources. Disclosed embodiments display identified units of interest and additional content collected in real-time in a graphical user interface (GUI). In an embodiment, a system displays identified units and additional content in a GUI display element similar to a chat window.

FIG. 1 illustrates components of an illustrative system 100 for automated generation and display of content concerning units of interest during online meetings. During an online meeting, a computer (e.g., one or more participant electronic devices) may transmit various signals to a server (e.g., an online meeting conferencing server) and receive signals back from the server in order to display a GUI including content concerning units of interest in real time on the one or more participant electronic devices.

The illustrative system 100 may include a conferencing server 110, a first participant electronic device 140, and a second participant electronic device 150. The first participant electronic device 140 and second participant electronic device 150 may be connected with the conferencing server 110 via hardware and software components of one or more network 160. Examples of the network 160 include, but are not limited to, Local Area Network (LAN), Wireless Local Area Network (WLAN), Metropolitan Area Network (MAN), Wide Area Network (WAN), and the Internet. The network 160 may include both wired and wireless communications according to one or more standards and/or via one or more transport mediums. The communication over the network 160 may be performed in accordance with various communication protocols such as Transmission Control Protocol and Internet Protocol (TCP/IP), User Datagram Protocol (UDP), and IEEE communication protocols. In one example, the network 160 may include wireless communications according to Bluetooth specification sets, or another standard or proprietary wireless communication protocol. The network 160 may also include communications over a cellular network, including, e.g. a GSM (Global System for Mobile Communications), CDMA (Code Division Multiple Access), or EDGE (Enhanced Data for Global Evolution) network.

The conferencing server 110, first participant electronic device 140, and second participant electronic device 150 may include one or more processors to control and/or execute operations of the system 100. In some embodiments, a single processor may be employed. In some embodiments, a plurality of processors may be employed for configuring the system 100 as a multi-processor system. The processor may include suitable logic, circuitry, and interfaces that are operable to execute one or more instructions to perform data transfer and other operations. The processor may be realized through a number of processor technologies. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. The processor may also include a Graphics Processing Unit (GPU) that executes the set of instructions to perform one or more processing operations.

Each of the first participant electronic device 140 and the second participant electronic device 150 may be any computing device allowing a participant/user to interact with a conferencing server 110. Each of the first participant electronic device 140 and the second participant electronic device 150 may be operated by a respective participant or a user during an electronic communication session associated with an online meeting. The terms participant and user may be used interchangeably throughout this disclosure. The examples of the computing device may include, but are not limited to, a cellular phone, a mobile phone, a desktop computer, a laptop, a personal digital assistant (PDA), a smartphone, a tablet computer, a smart watch, and the like. In operation, a user of the first participant electronic device 140 and/or the second participant electronic device 150 may execute an Internet browser and/or a local conferencing application that accesses conferencing server 110 in order to send and receive various categories of information for online meeting services. Each user may register on the local conferencing application installed on the respective participant electronic device 140, 150. If the user already has an account, then the participant electronic device may transmit credentials from a user interface to the conferencing server 110, from which the conferencing server 110 may authenticate the user and/or determine a user role. In an embodiment, the first participant electronic device 140 and the second participant electronic device 150 exchange audio, video, data, and control (AVDC) information 174 with conferencing server 110.

The first participant electronic device 140 and second participant electronic device 150 may be configured to generate input speech signals 172 containing audio data of participant utterances during an online meeting. For example, one or more participant electronic device may generate speech signals 172 during a participant's live oral presentation and/or a conversation among multiple participants in an electronic communication session associated with an online meeting. Each of first participant electronic device 140 and second participant electronic device 150 is configured to transmit input speech signals 172 to the conferencing server 110 over a network 160. In operation, participant electronic devices 140, 150 may transmit real-time input speech signals 172 in the form of streaming audio to the conferencing server 110. The streaming audio may incorporate various audio codecs such as AAC, MP3, OGG, ALAC, AMR, OPUS, VORBIS, or the like.

Conferencing server 110 may be a computing device comprising a processor and other computing hardware and software components configured to execute a centralized conferencing application in order to send and receive various categories of information to and from participant electronic devices 140, 150 associated with online meeting services, and to generate a conferencing GUI 120 for display by participant electronic devices 140, 150. In an illustrative example, video conference meeting participants operating devices 140, 150 can see other participants at one or more main video display windows 122 of conferencing GUI, and can present visual information for display at screen sharing/document display interface 124. In illustrative examples, display interface 124 may exhibit a participant electronic device screen (screen sharing), a presentation, a whiteboard, an authoring tool, a mind mapping tool, or a chat tool, among other possibilities. Conferencing GUI 120 includes an additional conferencing display 126 configured to display identified units of interest and additional content collected in real time by conferencing service during an electronic communication session associated with an online meeting. In an embodiment, additional conferencing display 126 includes a scrollable display of identified units and additional content in a GUI element similar to a chat window.

In an embodiment, conferencing server 110 exchanges AVDC information 174 with first participant electronic device 140 and second participant electronic device 150. AVDC signals implement telecommunication protocols for assembling the AVDC information into an IP packet and for providing audio-visual communication sessions on a packet network. Multi-channel communications between video conferencing endpoints 140, 150, and conferencing server 110 and multi-point conferencing applications executed by these computing devices may enable meeting participants to see and hear each other and at the same time share presentations or other documents.

Conferencing server 110 is configured to continuously parse 114 input speech signals 172 received from first participant electronic device 140 and second participant electronic device 150 into a set of spoken words within an electronic communication session. Alternatively, first participant electronic device 140 and second electronic device 150 may be configured to parse audio speech signals of speaker utterances into a set of spoken words included in input speech signals 172, and conferencing server may omit parsing module 114. Conferencing server 110 is configured to continuously identify 116 units of interest to meeting participants from the set of spoken words within an electronic communication session. Additionally, conferencing server 110 is configured to retrieve content associated with one or more identified units of interest obtained by searching one or more data collections in search portals/databases 190. Further, conferencing server is configured to present the one or more units of interest 116 and retrieved content 118 in an additional content display 126 of conferencing GUI. Modules 114, 116, 118 are software modules that provide this functionality, though this functionality may be otherwise integrated into the conferencing server 110, and more or fewer modules may be utilized.

Modules 114, 116, 118 operate in conjunction with an automatic speech recognition (ASR) database 134, topics database 136, and search parameters database 138. Components of conferencing server 110 may be logically and physically organized within the same or different devices or structures, and may be distributed across any number of physical structures and locations (e.g., cabinets, rooms, buildings, cities). For example, conferencing server 110 may comprise, or may be in networked-communication with ASR database 134, topics database 136, and search parameters database 138. The ASR database 134, topics database 136, and search parameters database 138 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the conferencing server 110.

In addition to recognizing units of interest based on words, phrases, and other data stored in ASR database 134 and topics database 136, units of interest identification module 116 can employ Natural Language Processing (NLP) models to recognize units of interest. For example, a Named Entity Recognition (NER) model can identify units of interest such as proper names, company names, product names, cities, geographic locations, etc. based upon categories trained in the NER model. NER techniques may identify these units of interest independently of categories previously stored in ASR database 134 and topics database 136.

In some embodiments, a memory of the ASR database 134, topics database 136, and search parameters database 138 may be a non-volatile storage device for storing data and instructions to be used by a processor of the conferencing server 110. The memory may be implemented with a magnetic disk drive, an optical disk drive, a solid state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

In some embodiments, the memory of the ASR database 134, topics database 136, and search parameters database 138 may be a temporary memory, such that a primary purpose of the memory is not long-term storage. The memory described as a volatile memory, meaning that the memory do not maintain stored contents when the conferencing server 110 is turned off. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

In an embodiment, spoken words parser module 114 applies ASR techniques to continuously parse input speech signals 172 into a set of spoken words in real time during an electronic communication session associated with an online meeting. ASR techniques may apply various machine learning models to recognize speech, such as an acoustic model and a language model. The acoustic model can be used to generate hypotheses regarding which words or sub word units (e.g., phonemes) correspond to an utterance based on the acoustic features of the utterance. The language model can be used to determine which of the hypotheses generated using the acoustic model is the most likely transcription of the utterance. ASR models may be based on a lexicon stored in ASR database 134. A lexicon generally refers to a compendium of words and associated pronunciations. As used herein, ASR models might refer to any class of algorithms that are used to parse input speech signals into a set of spoken words. In an embodiment, ASR models may refer to methods such as logistic regression, decision trees, neural networks, linear models, and/or Bayesian models.

ASR models may implement a continuous speech recognition system that is capable of recognizing fluent speech. Hidden Markov Models (HMMs) are the most popular models used in the area of continuous speech recognition. HMMs are capable of modeling and matching sequences that have inherent variability in length as well as acoustic characteristics. In various embodiments, HMM represents a temporal pattern in the form of a Finite State Network (FSN). Each state models spectral characteristics of a quasi-stationary segment of speech. At every time instant (frame of speech), the system either continues to stay in a state or makes a transition to another in a probabilistic manner. HMM provides efficient algorithms for estimation of parameters of the model from the training data, and efficient algorithms for recognition. Another advantage of HMM is its ability to integrate language models.

Spoken words parser module 114 may output a stream or list of spoken words. The stream of spoken words may include a time stamp associated with each respective spoken word. An API of the speaker electronic device may provide a time stamp included in the input speech signals 172 as each utterance is pronounced. Spoken words parser module 114 may also generate a transcription, e.g., a systematic representation of spoken words in written form. A speech-to-text engine of spoken words parser module 114 may generate an orthographic transcription, which applies rules for mapping spoken words onto written forms as prescribed by the orthography of a given language.

Topics database 136 stores topics data representing topics or subjects pertaining to an online meeting. Topics data include one or more category of interest to one or more meeting participants operating one or more devices 140, 150. The category of interest can provide a context for module 116 in identifying one or more units of interest from the set of spoken words, and can provide a context for module 118 in retrieving content associated with one or more units of interest. The category of interest may include one or more of a meeting subject, a word topic, a specialty search engine category, and a vertical search engine category, among other possibilities. In addition, topics database 136 may store data on other topics of interest to provide a context for operation of modules 116 and 118.

One or more meeting participants may identify a category of interest and other topics of interest before commencing an online meeting during an electronic communication session, and transmit the category of interest and other topics of interest to conferencing server for storage in topics database 136. In an example, a meeting organizer may identify a category of interest based on a meeting subject included in a meeting agenda. In another example, a meeting participant other than a meeting organizer may identify a category of interest by suggesting a specialty search engine category or vertical search engine category as a suitable resource to be searched for content associated with a category of interest. Associating one or more specialized search resources for a particular category or meeting topic can improve likelihood of retrieving additional content pertinent to items of interest during an online meeting. For example, a meeting of human resource professionals to discuss recruitment activities can incorporate an employment search engine as a search resource.

Units of interest identification module 116 applies NLP techniques to identify one or more spoken words within the set of spoken words output by parser module 114 as one or more units of interest. One or more units of interest identified by module 116 may include a keyword, key phrase, concept, and topic model, among other possibilities. Units of interest may include a sample image identified with one or more spoken words from the set of spoken words. In an example, a unit of interest may include a sample image representing a design trademark, in which the design trademark is associated with a word trademark identified with one or more spoken words within the set of spoken words. Module 116 may identify units of interest in real time with reference to categories stored in one or more databases 134, 136, 138. Additionally, module 116 may identify units of interest in real time via one or more third party data resources, with or without reference to categories stored in one or more databases 134, 136, and 138. For example, module 116 may identify units of interest via NLP model, such as an NER model. In another example, module 116 may identify units of interest via web resources, such as identifying images via image resource websites.

Units of interest identification module 116 may execute a machine learning model to identify one or more spoken words within a set of spoken words during the electronic communication session as one or more units of interest corresponding to the category of interest. In an embodiment, the machine learning model is trained to determine a context of the set of spoken words and to identify the one or more units of interest based on the context of the set of spoken words.

Disclosed embodiments may identify associations between meeting topics and word topics in a hierarchical topic model. The hierarchical topic model may be a real time NLP model with two latent topic layers: a meeting topic layer and a word topic layer. Meetings topics tend to be coarse-grained, while word topics tend to be fine-grained. The hierarchical topic model may capture a semantic connection between meeting topics and word topics. Each meeting topic may be associated with a multinomial distribution over word topics. The meeting topic layer may be generated from a sampled subject such as a category of interest to one or more meeting participants, a meeting subject, or other subject matter. The meeting topic layer may provide a context for identifying one or more units of interest based on a set of spoken words. Word topics may be generated from the meeting topic layer using NLP techniques such as named entity recognition and terminology extraction. In identifying units of interest, the hierarchical topic model may employ word sense disambiguation to determine meaning of ambiguous words or phrases in context.

Various probabilistic topic models are employed to represent documents, such as Latent Semantic Analysis (LSA), Probability Latent Semantic Indexing (PLSI), Latent Dirichlet Allocation (LDA) model, among other models. LSA is a natural language processing technique of analyzing relationships between a set of documents and the terms they contain by producing a set of concepts related to the documents and terms. LSA assumes that words that are close in meaning will occur in similar pieces of text. PLSI is a statistical technique for the analysis of two-mode and co-occurrence data. LDA is a probabilistic generative model that can be used to estimate the properties of multinomial observations via unsupervised learning. LDA represents each document as a mixture of probabilistic topics and each topic as a multinomial distribution over words.

Meeting topics and word topics may be extracted from a meeting agenda, presentation, conference paper, of other document prepared before an online meeting. One or more meeting participants may suggest meeting topics and/or word topics before an online meeting. For example, a meeting invitation may include a form for recipients to suggest meeting topics or word topics. One or more meeting participants may suggest meeting topics and/or word topics during or after an online meeting. For example, conferencing GUI 120 may include an input element for suggesting meeting topics or word topics. A user operating a participant electronic device may transmit data representing one or more meeting topics and/or word topics to conferencing server 110 for storage in topics database 136. Disclosed embodiments may train the machine learning model of units of interest identification module 116 using meeting topics data and word topics data.

Additional content search module 118 is configured to retrieve content associated with one or more units of interest in real time during an electronic communication session from one or more data collections associated with a category of interest. As referred to herein, content associated with one or more units of interest is sometimes referred to as additional content, denoting content that supplements traditional online meeting content such as audio-video of meeting participants, presentations, and other documents. Additional content search module 118 is configured to retrieve additional content by queries to search portals/databases 190 via network 180. Search queries may include information from search parameters database 138 such as previous search queries and listings of search resources indexed against categories of interest and other topics data. In preparation for an online meeting, one or more meeting participants may submit for storage in search parameters database 138 a set of content identifiers, titles, metadata, content, etc. associated with a set of webpages or other search resources that are potentially of interest to the participant, as well as topics referred to by the set of webpages.

Search portals/databases 190 may include, for example:

General search portals: web portals that aggregate results from several search engines into one page.

Horizontal portals: web portals that focus on a wide array of interests and topics, acting as general entry point into the internet.

Specialized portals: Portals that focus on search for specific types of information. This resource allows users to focus only on specialized content of interest. Examples of vertical search engines include social search engines, which allow users to search for content from social media sites such as Facebook®, Twitter®, Google+®, and LinkedIn. Employment search engines such as Indeed® enable job seekers and recruiters to find each other. Users can post jobs, upload resumes and search multiple job databases for positions and applicants. Some specialized search engines focus on specialized content in portions of web pages and ignore the rest of the pages. An example of this type of specialized search engine is blog search engines, which focus on posts and ignore the rest of web pages.

Vertical portals: web portals that focus on a specific industry, domain, or vertical. Vertical portals may be considered a type of specialized portal that provides tools, information, articles, research, and statistics on the specific industry, domain or vertical. Vertical portals may be suitable resources to seek additional content concerning categories associated with a specific industry, domain, or vertical.

Marketplace portals: portals that support business-to-business and business-to-customer e-commerce, with software support for e-commerce transactions. Marketplace portals may be suitable resources to seek additional content concerning categories such as products and services.

Media Portals: portals that focus on business, consumer, or entertainment news. Media portals may be suitable resources, for example, to seek additional content concerning categories such as news and public affairs.

Wikis: Web sites that allow users to add and update content on the site using their own Web browser. Wiki content is generally created mainly by collaborative effort of site visitors, with oversight (the power to suppress information subject to strict requirements) entrusted to a restricted number of users. Wiki sites may be suitable resources, for example, to seek additional content concerning categories such as technical concepts and specialized terminology.

In an embodiment, additional content search module 118 may employ a sample image in a content-based image retrieval (CBIR) query. Reverse image search engines employ a CBIR query technique that bases searches upon a sample image rather than text. Various CBIR search engines may search for images based on visual attributes such as color, texture, shape/object, etc.

FIG. 2 shows a representative view of a conferencing graphical user interface 200 displayed on a participant electronic device (e.g., device 150) including a GUI element 250 of a document 260 including additional content related to an identified unit of interest 290. Graphical user interface 200 includes main video display 210, screen sharing/document display 220, and controls 230. Element 250 is a graphical user interface element overlaying one or more additional content items 264 of a document 260 along with one or more units of interest 290. In FIG. 2, one unit of interest 290 and additional content item 260 are shown. In an embodiment, one or more additional content items and units of interest are displayed in a language selected by a user in one of the participant electronic devices 140, 150. A display area 262 presents the various interface elements and document contents to the user. The display area 262 may be a graphical user interface (GUI) display region on a computer screen, and may include an additional content region 260 in which the document's additional content 264, such as the information displayed on an internet page, may be displayed. The additional content 264 is shown in FIG. 2 as text, although any form of document may be displayed (e.g., text, graphics, spreadsheets, colors, pictures, fonts, images, animations, etc.). The additional content may be interactive. As shown, additional content 264 is a text document overlay that includes a web link 268. Element 250 may include a graphic frame 254 surrounding the display area 262. Graphic frame 258 may help delineate the additional content as an overlay of conferencing GUI 200 for ease of presentation. Additionally, GUI element 250 may include an inner frame 270 or other graphical structure that may help delineate a given item of additional content from other content within display area 262.

Display area 262 may display additional content 264 as scrolling text or other form of scrolling document. Additional content region 260 may have a vertical scroll direction or horizontal scroll direction in which one or more documents may scroll automatically and/or under user control. GUI element 250 may include a scroll bar 258 extending along the scroll direction in which the user may navigate the scrolling document manually. Display area 262 also includes a unit of interest element 280. Unit of interest element 280 may overlay a portion of the content of the document being viewed, to distinguish the element 280 from the content being displayed and help frame the additional content region 260, and may be given a distinct appearance as well. For example, the element 280 may have a color scheme, theme, brightness, animation, or other visual appearance that differs from that of the underlying document. Element 280 may display a unit of interest, UNIT-INT 290, associated with additional content region 260.

Unit of interest element 280 may be a persistent element that maintains its position relative to the display area 262 as the display area 262 scrolls through different portions of a displayed document. For example, element 280 appears at an upper edge of the display area 262, and as the GUI navigates up and/or down through the displayed document, element 280 may remain at the top in a fixed position. The element 280 need not be fixed at the upper edge, as it may alternatively be fixed to a left or right side, a lower edge, or on any other aspect of the display area 262. Maintaining a fixed position may help minimize user confusion in navigating a content item while viewing an associated unit of interest. Alternatively, a display element showing the unit of interest may be included in the scrollable display area 262 and may move along with the associated additional content 260.

GUI 200 includes an input element 235, such as a star rating control or a like/dislike button, for real time user rating of displayed additional content. User ratings of displayed additional content can be input into the machine learning model of units of interest identification module 116 along with the associated additional content to train the machine learning model to identify topics of interest based on a context of the set of spoken words.

Figure 3:
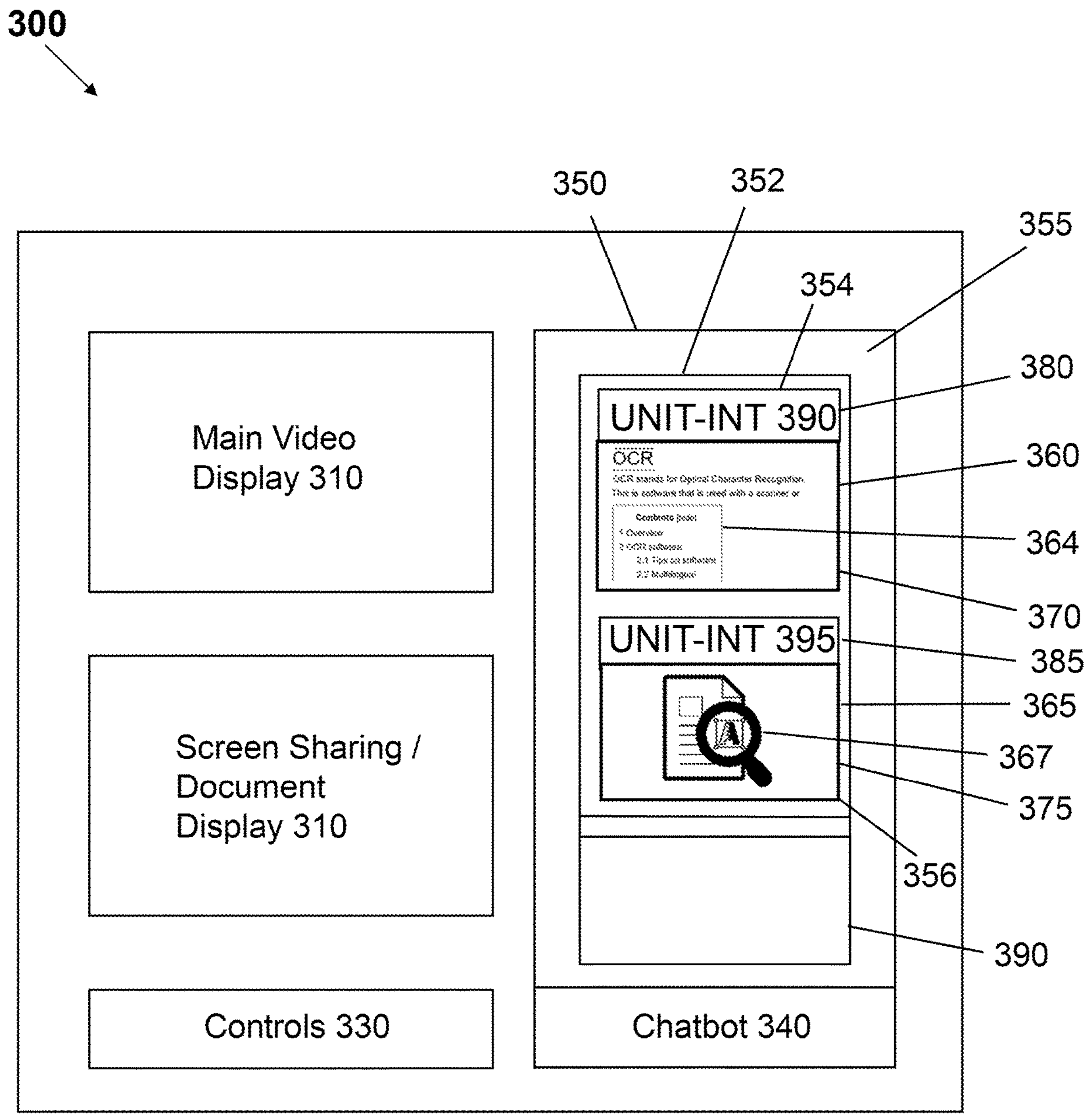
FIG. 3 shows a representative view of a graphical user interface including a GUI element displaying a web page and a graphics document including additional content related to respective identified units of interest, according to an embodiment.

FIG. 3 shows a representative view of a conferencing graphical user interface 300 including a GUI element 350. In contrast to the GUI element of FIG. 2 that displays a single document overlay including additional content, GUI element 350 displays two document overlays 354, 356 including additional content items respectively associated with two units of interest 390, 395. Multiple instances of additional content are also referred to herein as additional content items, or simply content items. Display region 352 is a scrollable display element that exhibits document overlays 354 and 356 in visually distinct portions of the display region. Document overlay 354 includes additional content region 360 displaying additional content 364, and item of interest region 380 displaying unit of interest UNIT-INT 390. Document overlay 356 includes additional content region 365 displaying additional content 367, and item of interest region 385 displaying unit of interest UNIT-INT 395. Additional content 364 displays a snippet from a web page, while additional content 367 displays a graphics document.

Element 350 may include a graphic frame 355 surrounding the display area 352. Document overlays 354, 356 include respective frames 370, 375 that may help delineate each additional content item from other items within display area 352. Element 350 is distinguishable from the element 250 of FIG. 2 in which the unit of interest element 280 of a single displayed content item is a persistent element that maintains its position relative to the display area 262. In contrast, unit of interest regions 380, 385 of multiple displayed content items are configured to move along with associated additional content 360, 365, e.g., in a downward scroll direction. In an embodiment, scrollable display area 352 incorporates auto scroll, similar to automatically scrolling down a chat window to a newest message. When the scrollable display area 352 receives a new content item, auto scroll will automatically scroll down to display the newest content item, such as content item 354.

Conferencing GUI 300 also includes an overlay input element 390. Input element 390 is configured to receive a text string from a participant electronic device 140, 150, and display an automatic response. In an embodiment, the automatic response is generated by a chatbot interface 340.

In an embodiment, spoken words parser module 114 outputs a stream or list of spoken words in the speaker's language and unit of interest identification module 116 identifies units of interest in that language. Upon receiving a request from a participant electronic device 140, 150 to display additional content 126 in a different language, conferencing server 110 may perform machine translation of units of interest and additional content text into the requested language before displaying the additional content at the participant electronic device.

Figure 4:
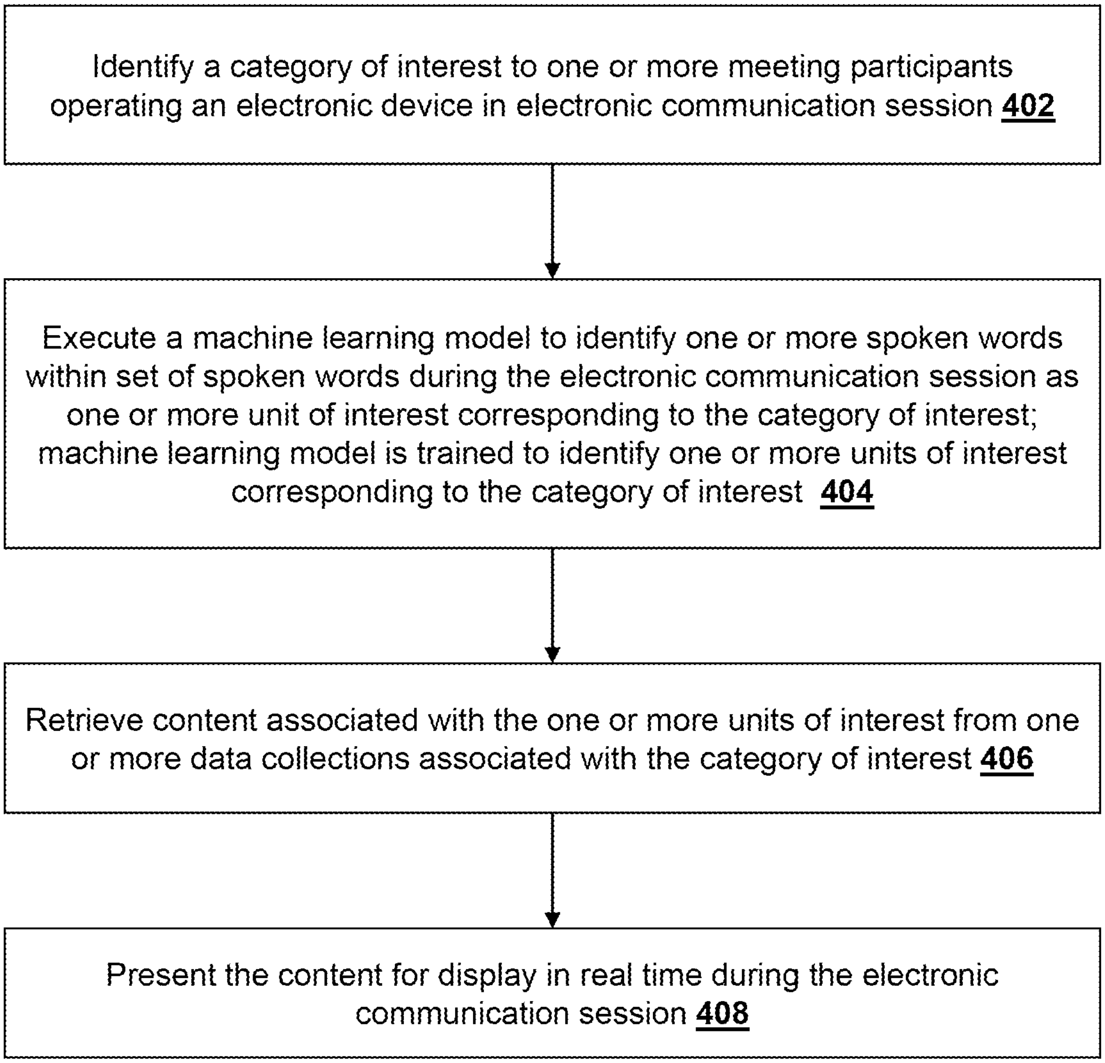
FIG. 4 shows a flow chart schematic diagram of a method for automated suggestions concerning topics of interest during online meetings, according to an embodiment.

FIG. 4 shows execution steps of a processor-based method for automated suggestions concerning topics of interest during online meetings 400. The illustrative method 400 shown in FIG. 4 comprises execution steps 402, 404, 406, 408. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another.

At step 402, a processor identifies a category of interest to one or more meeting participants operating an electronic device in electronic communication session. In an embodiment, the electronic device transmits the identified category of interest to the processor for storage in a memory device in communication with the processor before commencing the electronic communication system. The category of interest may include a meeting subject, a word topic, a specialty search engine category, or a vertical search engine category, among other possibilities.

At step 404, the processor executes a machine learning model to identify one or more spoken words within set of spoken words during the electronic communication session as one or more unit of interest corresponding to the category of interest. The machine learning model is trained to determine a context of the set of spoken words and to identify one or more units of interest based on the context of the set of spoken words. In an embodiment of step 404, the processor receives input speech signals associated with meeting participant utterances during an electronic communication session 402 and parses the input speech signals to generate a set of spoken words. In an embodiment, a processor of a conferencing server may receive input speech signals from one or more participant electronic device. The participant electronic devices may transmit real-time input speech signals in the form of streaming audio to the processor of the conferencing server. The input speech signals may be generated via a microphone, handset, or other transducer that converts sound into an electrical signal.

In an embodiment of step 404, an API of one or more electronic devices operated by meeting participants may provide a time stamp included in the input speech signals as each utterance is pronounced. In an embodiment, step 404 applies ASR techniques to continuously parse input speech signals into a set of spoken words in real time. In an embodiment, step 404 parses a stream or list of spoken words from the input speech signals. The stream of spoken words may include a time stamp associated with each respective spoken word.

One or more units of interest corresponding to the category of interest identified in step 402 may include a keyword, a key phrase, a concept, a topic model, and an image, among other possibilities. In an embodiment, a unit of interest includes a sample image associated with one or more spoken words.

In an embodiment of step 404, the machine learning model is a hierarchical topic model. The hierarchical topic model may be a real time NLP model with two latent topic layers: a meeting topic layer and a word topic layer. The meeting topic layer may provide a context for identifying one or more units of interest based on a set of spoken words. The hierarchical topic model may generate word topics using NLP techniques such as named entity recognition, terminology extraction, and word sense disambiguation. Meeting topics and word topics may be extracted from a meeting agenda, presentation, conference paper, of other document prepared before an online meeting. One or more meeting participants may suggest meeting topics and/or word topics before an online meeting. One or more meeting participants may suggest meeting topics and/or word topics during or after an online meeting.

In an embodiment, the participant electronic device may record an audio file of the meeting participant utterances and send recorded audio file to the conferencing server. The audio file may be in the formats such as WAV, MP3, WMA, AU, AA, AMR, RA, AWB, WV, or the like.

At step 406, the processor retrieves content associated with the one or more units of interest by the processor from one or more data collections associated with the category of interest. The one or more data collections may include general search portals, horizontal portals, specialized portals, vertical portals, marketplace portals, media portals, and wikis, among other possibilities. In examples of data collections associated with the category of interest, the category of interest may be a specialty search engine category or a vertical search engine category.

In an embodiment of step 406, one or more units of interest may include a sample image associated with the one or more spoken words, and the processor may retrieve content associated with the sample image via content-based image retrieval (CBIR) query.

At step 408, the processor dynamically presents the content for display in real time during the electronic communication session. In an embodiment of step 408, the processor displays the content as an overlay of a graphical user interface of the electronic communication session. The processor may display the overlay of the graphical user interface in a plurality of graphically distinct content segments corresponding to respective units of interest of the one or more units of interest. The overlay may include an input element configured to receive a text string from the electronic device and display an automatic response. The processor may generate the automatic response via chatbot interface.

In various embodiments, displayed content may include one or more of a document, a web site, text, graphics, spreadsheets, colors, pictures, fonts, still images or moving images. One or more content item and one or more unit of interest may be displayed in a language selected by a user at a participant electronic device.

In an embodiment of step 408, the processor may present the content for display in a GUI element including a graphic frame surrounding a display area. The GUI display element may display a single content overlay or may display multiple overlays in visually distinct portions of the display region. The display area may present the content as scrolling text or other form of scrolling document. The GUI display may incorporate auto scroll. The GUI display may include an input element configured for real-time user rating of displayed content.

In an example of the method 400, a meeting participant operating a participant electronic device identifies 402 a category of interest "Automated Text Conversion" and submits the category of interest along with a meeting agenda document on this topic to conferencing server 110 for storage in topics database 136. During an electronic communication session of an online meeting, the conferencing server parses oral communications of meeting participants into a stream of spoken words; executes 404 a machine learning model to identify units of interest corresponding to the category Automated Text Conversion in the context of the meeting agenda; retrieves 406 content associated with identified units of interest; and displays 408 content associated with the units of interest, all in real time. The displayed content items include a text document 264 associated with the unit of interest 290 "Speech to Text", a graphics document 367 containing a sample image associated with the unit of interest 395 "OCR Icon", and a wiki site snippet 364 associated with the unit of interest 390 "Optical Character Recognition".

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM, or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:

receiving, by a processor during an electronic communication session, an input audio signal associated with utterances of one or more meeting participants operating an electronic device;

generating, by the processor, a set of spoken words for the one or more meeting participants by parsing the input audio signal and the utterances of the one or more meeting participants;

without receiving a communication associated with the electronic communication session, prior to the electronic communication session, identifying, by the processor, a category of interest corresponding to the one or more meeting participants operating the electronic device in the electronic communication session;

executing, by the processor during the electronic communication, a machine learning model to identify one or more spoken words within the set of spoken words generated during the electronic communication session as one or more units of interest corresponding to the category of interest, the one or more units of interest including at least one of a geographic location, a product, an entity, or a name associated with the category of interest, wherein the machine learning model is trained to determine a context of the set of spoken words and to identify the one or more units of interest based on the context of the set of spoken words during the electronic communication session, wherein the machine learning model was previously trained based on meeting topics data and word topics data prepared before the electronic communication session, wherein the machine learning model is a hierarchical topic model that includes a plurality of layers, including a first topic layer that corresponds to the meeting topics data and a second topic layer that corresponds to the word topics data, wherein the first topic layer generates the context for identifying the one or more units of interest based on the set of spoken words and uses the context and meeting topics to generate the meeting topics data, wherein the second topic layer generates the word topics data by using terminology extraction and word sense disambiguation on word topics, wherein the meeting topics and the word topics are extracted from one or more of a meeting agenda, meeting topics suggestions, a presentation, or a conference paper, and wherein each meeting topic is associated with multinomial distribution over corresponding word topics ;

receiving, by the processor from the electronic device, a request to display content in accordance with a second language that is different from a language of the set of spoken words;

retrieving, by the processor from one or more data collections associated with the category of interest, content associated with the one or more units of interest identified by the machine learning model for translation into the second language;

identifying, by the processor from the one or more data collections associated with the category of interest, a website associated with the one or more units of interest identified based on the set of spoken words;

presenting, by the processor for display on the electronic device in real time during the electronic communication session, the content and a portion of the identified website in the second language;

displaying, by the processor, the content and the portion of the identified website as an overlay of a graphical user interface of the electronic communication session, wherein the overlay of the graphical user interface is displayed in a plurality of graphically distinct content segments corresponding to respective units of interest of the one or more units of interest;

receiving, by the processor from the electronic device, an input using an input element on the graphical user interface that indicates feedback regarding the content and the portion of the identified website; and training, by the processor, the machine learning model in accordance with the input.

2. The method of claim 1, wherein the set of spoken words further comprises a speech-to-text transcript generated via automatic speech recognition of the input audio signal including the utterances of the one or more meeting participants.

3. The method of claim 1, wherein the overlay further comprises another input element configured to receive a text string from the electronic device and display an automatic response.

4. The method of claim 3, wherein the automatic response is automatically generated by a chatbot interface of the processor.

5. The method of claim 1, wherein the content further comprises a link to another website.

6. The method of claim 1, wherein the retrieving the content associated with the one or more units of interest further employs a set of search resources received before the electronic communication session.

7. The method of claim 1, wherein identifying the category of interest further comprises storing the category of interest in memory in communication with the processor before commencing the electronic communication session.

8. The method of claim 1, wherein the category of interest is selected from the group consisting of meeting subject, word topic, specialty search engine category, and vertical search engine category.

9. The method of claim 1, wherein the one or more units of interest further comprises a sample image associated with the one or more spoken words, wherein the retrieving content associated with the one or more units of interest employs a content-based image retrieval (CBIR) query.

10. A system comprising:

an electronic device being operated by one or more meeting participants operating the electronic device in an electronic communication session;

a non-transitory storage medium storing a category of interest corresponding to the one or more meeting participants, without receiving a communication, prior to the electronic communication session; and a server in communication with the storage medium and connected to the electronic device via one or more networks; wherein the server is configured to:

receive, during the electronic communication session, an input audio signal associated with utterances of one or more meeting participants operating the electronic device;

generate a set of spoken words for the one or more meeting participants by parsing the input audio signal and the utterances of the one or more meeting participants;

execute, during the electronic communication, a machine learning model to identify one or more spoken words within the set of spoken words generated during the electronic communication session as one or more units of interest corresponding to the category of interest, the one or more units of interest including at least one of a geographic location, a product, an entity, or a name associated with the category of interest, wherein the machine learning model is trained to determine a context of the set of spoken words and to identify the one or more units of interest based on the context of the set of spoken words during the electronic communication session, wherein the machine learning model was previously trained based on meeting topics data and word topics data prepared before the electronic communication session, wherein the machine learning model is a hierarchical topic model that includes a plurality of layers, including a first topic layer that corresponds to the meeting topics data and a second topic layer that corresponds to the word topics data, wherein an input to the hierarchical topic model is fed sequentially through the plurality of layers, wherein the first topic layer generates the context for identifying the one or more units of interest based on the set of spoken words and uses the context and meeting topics to generate the meeting topics data, wherein the second topic layer generates the word topics data by using terminology extraction and word sense disambiguation on word topics, wherein the meeting topics and the word topics are extracted from one or more of a meeting agenda, meeting topics suggestions, a presentation, or a conference paper, and wherein each meeting topic is associated with a multinomial distribution over corresponding word topics;

receive, from the electronic device, a request to display content in accordance with a second language that is different from a language of the set of spoken words;

retrieve, from one or more data collections associated with the category of interest, content associated with the one or more units of interest identified by the machine learning model for translation into the second language;

identify, from the one or more data collections associated with the category of interest, a website associated with the one or more units of interest identified based on the set of spoken words; and present, for display on the electronic device in real time during the electronic communication session, the content and a portion of the identified website in the second language;

display the content and the portion of the identified website as an overlay of a graphical user interface of the electronic communication session, wherein the overlay of the graphical user interface is displayed in a plurality of graphically distinct content segments corresponding to respective units of interest of the one or more units of interest;

receive, from the electronic device, an input using an input element on the graphical user interface that indicates feedback regarding the content and the portion of the identified website; and train the machine learning model in accordance with the input.

11. The system of claim 10, wherein the server is configured to present the content for display in real time as the overlay of the graphical user interface of the electronic communication session within a graphic frame in which the overlay may be scrolled.

12. The system of claim 10, wherein the category of interest is selected from the group consisting of meeting subject, word topic, specialty search engine category, and vertical search engine category.

13. A system comprising:

a non-transitory storage medium storing a plurality of computer program instructions; and a processor of a first electronic device electrically coupled to the non-transitory storage medium and configured to execute the plurality of computer program instructions to:

receive, during an electronic communication session, an input audio signal associated with utterances of one or more meeting participants operating the first electronic device;

generate a set of spoken words for the one or more meeting participants by parsing the input audio signal and the utterances of the one or more meeting participants;

without receiving a communication, prior to the electronic communication session, identify a category of interest corresponding to the one or more meeting participants operating the first electronic device in the electronic communication session;

execute, during the electronic communication, a machine learning model to identify one or more spoken words within the set of spoken words generated during the electronic communication session as one or more units of interest corresponding to the category of interest, the one or more units of interest including at least one of a geographic location, a product, an entity, or a name associated with the category of interest and the machine learning model predicting a topic of the electronic communication session based on a meeting agenda, wherein the machine learning model is trained to determine a context of the set of spoken words and to identify the one or more units of interest based on the context of the set of spoken words during the electronic communication session, wherein the machine learning model was trained before the electronic communication session by applying a hierarchical topic model based on meeting topics data and word topics data prepared before the electronic communication session, wherein the hierarchical topic model includes a plurality of layers, including a first topic layer that corresponds to the meeting topics data and a second topic layer that corresponds to the word topics data, wherein the first topic layer generates the context for identifying the one or more units of interest based on the set of spoken words and uses the context and meeting topics to generate the meeting topics data, wherein the second topic layer generates the word topics data by using terminology extraction and word sense disambiguation on the-word topics, wherein the meeting topics and the word topics are extracted from one or more of a meeting agenda, meeting topics suggestions, a presentation, or a conference paper, and wherein each meeting topic is associated with a multinomial distribution over corresponding word topics;

receive, from the first electronic device, a request to display content in accordance with a second language that is different from a language of the set of spoken words;

retrieve, from one or more data collections associated with the category of interest, content associated with the one or more units of interest identified by the machine learning model for translation into the second language;

identify, from the one or more data collections associated with the category of interest, a website associated with the one or more units of interest identified based on the set of the spoken words;

present, for display on the first electronic device in real time during the electronic communication session, the content and a portion of the identified website in the second language;

display the content as an overlay of a graphical user interface of the electronic communication session, wherein the overlay of the graphical user interface is displayed in a plurality of graphically distinct content segments corresponding to respective units of interest of the one or more units of interest;

receive, from the electronic device, an input using an input element on the graphical user interface that indicates feedback regarding the content and the portion of the identified website; and train the machine learning model in accordance with the input.

14. The system of claim 13, wherein the processor of the first electronic device is configured to present the content for display by the first electronic device in real time as the overlay of the graphical user interface of the electronic communication session within a graphic frame in which the overlay may be scrolled.

* * * * *